(12) United States Patent
Blanchard

(10) Patent No.: US 8,150,097 B2
(45) Date of Patent: Apr. 3, 2012

(54) CONCEALED METADATA TRANSMISSION SYSTEM

(75) Inventor: Robert Noel Blanchard, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1067 days.

(21) Appl. No.: 11/657,779

(22) Filed: Jan. 24, 2007

(65) Prior Publication Data

US 2008/0178246 A1 Jul. 24, 2008

(51) Int. Cl.
*G06K 9/00* (2006.01)
(52) U.S. Cl. ........................................................ 382/100
(58) Field of Classification Search .................... 382/100
See application file for complete search history.

(56) References Cited

U.S. PATENT DOCUMENTS

| | | | | |
|---|---|---|---|---|
| 5,410,326 A * | 4/1995 | Goldstein | ..................... | 348/734 |
| 5,631,710 A * | 5/1997 | Kamogawa et al. | .......... | 348/555 |
| 5,710,815 A * | 1/1998 | Ming et al. | ..................... | 380/241 |
| 6,246,775 B1 * | 6/2001 | Nakamura et al. | ............. | 382/100 |
| 6,483,927 B2 * | 11/2002 | Brunk et al. | ................... | 382/100 |
| 6,614,844 B1 | 9/2003 | Proehl | | |
| 6,621,933 B2 * | 9/2003 | Chung et al. | ................... | 382/233 |
| 6,801,713 B1 * | 10/2004 | Yagawa et al. | ................... | 386/69 |
| 6,973,582 B2 | 12/2005 | Sugiura et al. | | |
| 7,430,302 B2 * | 9/2008 | Thorwirth | ..................... | 382/100 |
| 7,555,650 B1 * | 6/2009 | Zhao et al. | ..................... | 713/176 |
| 7,630,509 B2 * | 12/2009 | Zarrabizadeh | ................ | 382/100 |
| 2001/0052076 A1 * | 12/2001 | Kadono | ......................... | 713/176 |
| 2002/0069411 A1 * | 6/2002 | Rainville et al. | ................ | 725/37 |
| 2003/0126607 A1 * | 7/2003 | Phillips et al. | ................... | 725/55 |
| 2004/0153364 A1 * | 8/2004 | Natsubori | ....................... | 705/14 |
| 2004/0216159 A1 * | 10/2004 | Yassa | ............................... | 725/46 |
| 2005/0137958 A1 * | 6/2005 | Huber et al. | ..................... | 705/37 |
| 2006/0048208 A1 * | 3/2006 | Sibley et al. | ................... | 725/153 |
| 2006/0159426 A1 * | 7/2006 | Seo | ................................. | 386/94 |
| 2007/0030966 A1 * | 2/2007 | Sra et al. | ......................... | 380/201 |
| 2007/0115392 A1 * | 5/2007 | Masuda et al. | ................ | 348/678 |

* cited by examiner

*Primary Examiner* — Wenpeng Chen
(74) *Attorney, Agent, or Firm* — Dickstein Shapiro LLP

(57) ABSTRACT

System and method for embedding and concealing data within a video signal such that the embedded data is displayed within an unused portion of a video display area such that the embedded data is not visually offensive. In one embodiment the encoding of metadata may be executed by translating or adjusting pixel values of the video signal within the secondary image area, such that the pixel values are repurposed to contain the metadata and wherein the metadata is visually imperceptible.

21 Claims, 6 Drawing Sheets

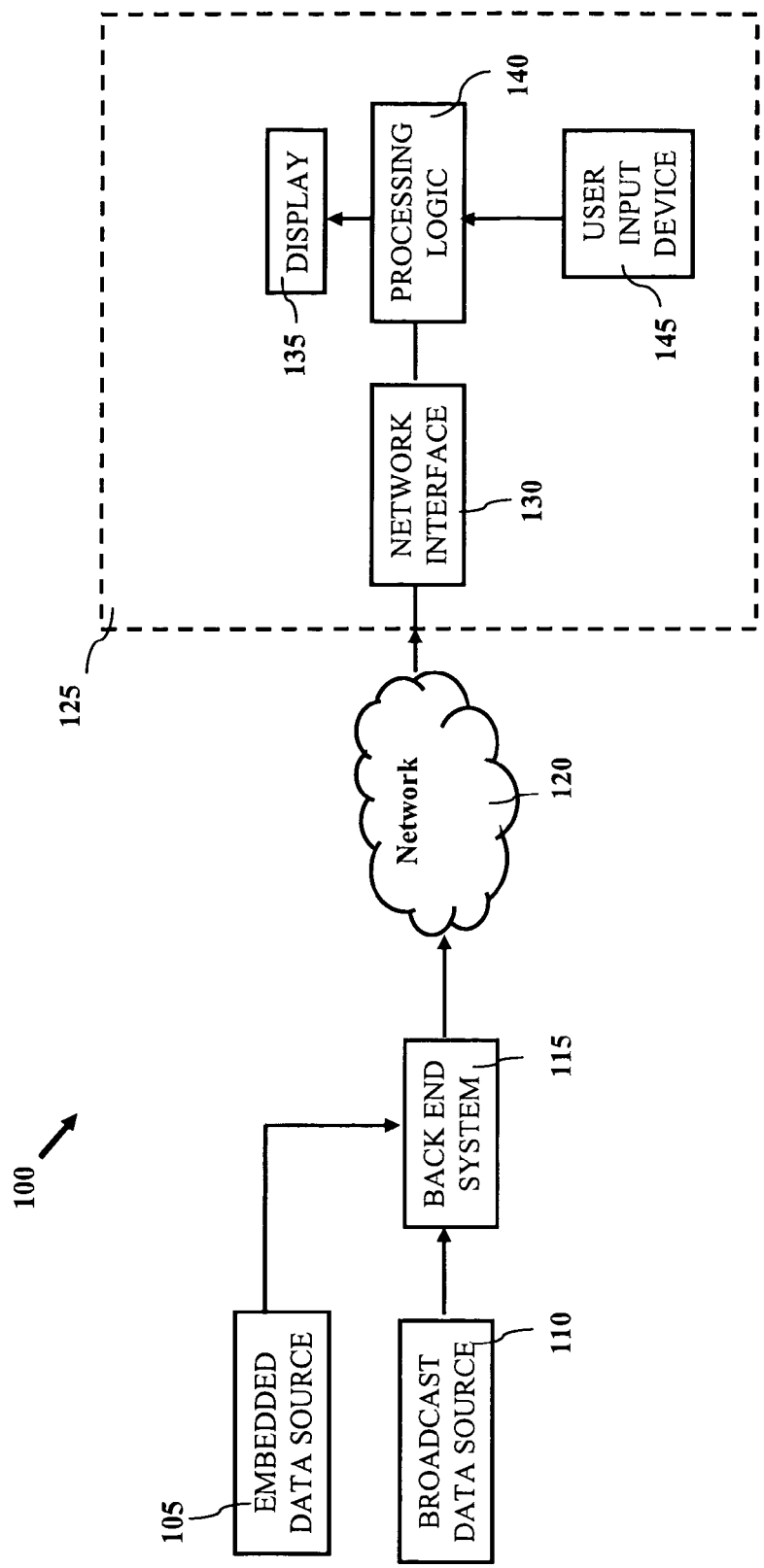

CONCEALED METADATA TRANSMISSION SYSTEM

FIELD OF THE INVENTION

The present invention relates in general to a method and apparatus for passing metadata through networks, cable and satellite systems, or broadcasts without corrupting or losing data.

BACKGROUND

Traditional television broadcasting devices have enabled additional broadcast related information to be transmitted along with broadcast programs, (e.g., closed captioning). In analog television formats, such as NTSC, additional information is encoded in the vertical blanking area (VBI). As television formats progress to all digital systems the VBI is no longer utilized for carrying information. Digital systems enable information to be encoded in the picture frame user area as defined by MPEG systems. With the expansion of high bandwidth networks providing an increasing volume of information and the adoption of digital transmission networks, there exists a need for providing additional information along with broadcasted audio and video content. One way existing broadcast systems have supplied additional information with broadcasted media is to rely on separate transmission paths such as phone lines or the internet. As additional broadcast related data is passed through networks, cable and satellite systems, or broadcast plants, the additional broadcast data is susceptible to corruption or loss of data.

Accordingly, there is a need in the art to provide a system or method able to provide additional information along with media content without the need of a separate transmission path wherein the additional information is not corrupted or lost.

BRIEF SUMMARY OF THE INVENTION

Disclosed and claimed herein are systems, methods and apparatus for encoding and displaying data embedded within unused portions of a video signal. In one embodiment, a method includes a media signal having a first display format from a broadcast source, wherein the signal comprises video content and embedded data. The received media signal is then decoded. Video content may then be displayed in a primary image area of a display device the primary image area having a second display format. A secondary image area may then be displayed simultaneously with the video content, wherein the secondary image area is outside the primary area and contains the embedded data. The method further includes, concealing embedded data within the secondary image area such that the embedded data is not visually offensive.

Other aspects, features, and techniques of the invention will be apparent to one skilled in the relevant art in view of the following detailed description of the invention.

BRIEF DESCRIPTION OF THE DRAWINGS

FIGS. 1A-1B depict embodiments of simplified system diagrams of one or more aspects of the invention;

DETAILED DESCRIPTION OF EXEMPLARY EMBODIMENTS

Figure 1B:
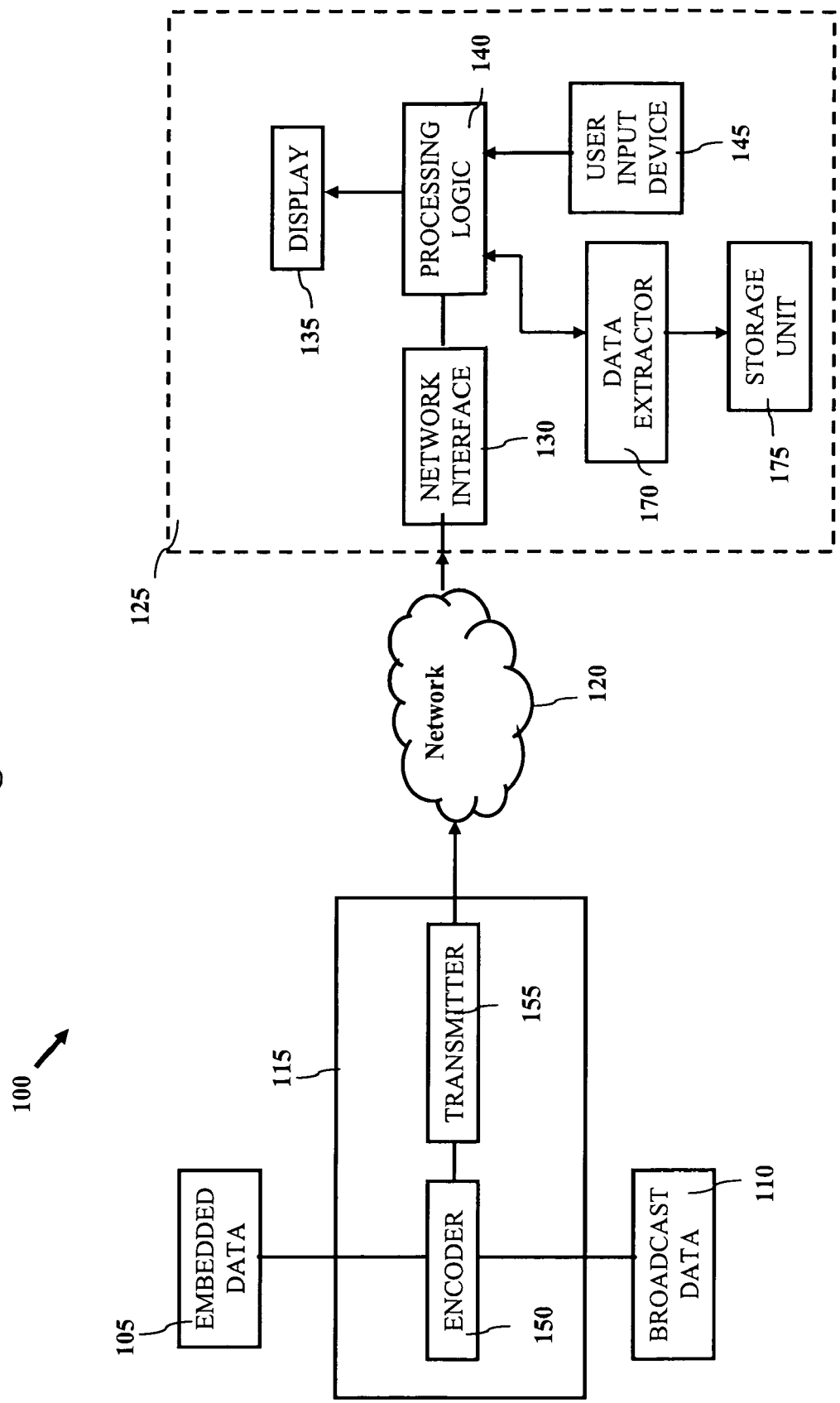

One aspect of the present invention is directed to displaying embedded data within a secondary image area of a display device, wherein the data is concealed. In one embodiment, the invention relates to video signal processing logic or a display device. The invention may be housed in the display device or may be separate and utilized as a component of a video signal interface such as a set top box. This embodiment may also be connected through a video signal interface to the display. To that end, the invention may be housed in a set-top box which provides a video signal to a display device for presentation of video content.

In one embodiment, data is embedded into a video signal through an encoding process. The encoding process may be through adjustment of pixel values such that the data is visually imperceptible or otherwise concealed. The adjustment of the pixels may be through translating lumen components of a plurality of pixels, illuminating pixels at varying intensities, illuminating pixels at varying black or white intensity levels, scrolling intensity values within a specified image area, varying the intensity of a graphic that scrolls in a particular image area or translating color difference components of pixel values.

Another aspect is to provide a system for encoding data within a video signal wherein the encoded data is passed through a network, cable or satellite system without corruption or loss of data. In one embodiment of the invention metadata is encoded into a video signal and transmitted to a receiving device. The system provides a network interface which is capable of decoding the media signal and processing logic to display video content from the broadcasted media signal. Video content from the video signal is displayed in a primary image area and the encoded metadata is displayed in a secondary image area such that the encoded metadata is embedded in the video signal in a visually imperceptible manner and extractable for later use and/or storage. Once embedded data is extracted it may be available for storage in a memory device or subsequent use as guide data, program data to convey upcoming programming information, data to upgrade manufactures display devices, metadata or user accessible data. The embedded data may also convey network communications data for messages from the network to affiliates, closed captioning data which can then be displayed over the primary video, content advisory data, forensic data used to identify video content and/or audience measurement data.

When implemented in software, the elements of the invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory or other nonvolatile memory, a floppy diskette, a CD-ROM, an optical disk, a hard disk, a fiber optic medium, a radio frequency (RF) link, etc. The code segments may be downloaded via computer networks such as the Internet, Intranet, etc.

Referring now to the drawings, FIGS. 1A-1B illustrate one or more embodiments of a system 100 capable of implementing one or more aspects of the invention. In the embodiment of FIG. 1A the system 100 includes a back end system 115 which receives embedded data and broadcast data for transmission over network 120 to client side module 125. In one embodiment broadcast data source 110 may include data streams in a multitude of forms (e.g., National Television Standards Committee (NTSC), PAL, Digital Satellite System (DSS), Digital Broadcast system (DBS), Advanced Television Standards Committee (ATSC), etc.).

In one embodiment the embedded data source 105 provides guide data, device updates, metadata or user accessible data encoded by back end system 15 for transmission or a media signal to client side system 125. Client side system 125 receives the broadcasted media signal via network interface 130 and may provide the media signal to processing logic 140. In one embodiment network interface 130 may be an analog or digital television tuner. Processing logic 140 provides the media signal to a display device 135 and may receive input from a user input device 145. Display device 135 receives video content and embedded data which then may be displayed.

FIG. 1B depicts one embodiment of system 100 wherein the back end system 115 may further comprise an encoder 150 and a transmitter 155. Encoder 150 may execute a process for embedding data into broadcast data which may then be packaged. Transmitter 155 may produce a media signal including the embedded data. The client side system 125 may further comprise a data extractor 170 which may extract embedded data from a video portion of a broadcasted media signal and provide the data to storage unit 175. Storage unit 175 may be a memory device or included in processing logic 140 for storing extracted data.

Figure 2:
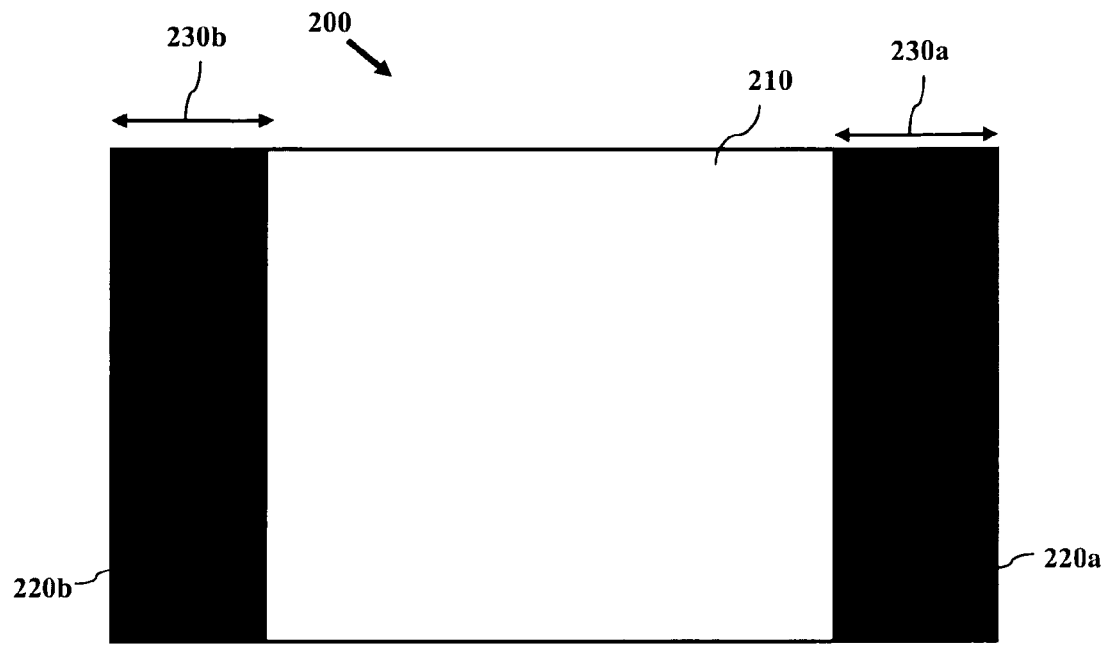
FIG. 2 depicts a representative example of regions in which data may be embedded within the display area of a video signal, according to one embodiment.

Referring now to FIG. 2 which depicts an exemplary embodiment of the display area 200 of a display device. Display area 200 is composed of a primary image area 210 and secondary image areas 220a and 220b. High definition broadcasts may be provided with an aspect ratio of 16:9 providing a 1920×1080 image format wherein the entire display area 200 is utilized by an active image. However, during commercial segments of a high definition broadcast, only a portion of the picture area maybe utilized. Commercials are typically encoded in a standard definition format which presently carries an aspect ratio of 4:3. Additionally, any standard definition programming displayed in a 16:9 display device or otherwise may occupy only a portion of the display area. Typically a 720×480 image is displayed in a 4:3 aspect ratio which occupies the primary image area 210. The secondary image areas 220a and 220b are typically reserved as a solid black color forming pillar bars around the active image area 210. These secondary regions may be referred to as pillar bars or pillarbox display regions. The secondary image area widths 230a and 230b may have a width of 600 pixels with a 1920×1080 format (280 with a 1280×720 format) when a centered 4:3 image is produced. With a 1920×1080 format and a centered 4:3 image there are 1,296,000 unused pixels that may be repurposed for data (648,000 per frame with interlaced 1080 format). With a 1280×720 format and a centered 4:3 image there are 403,200 unused pixels that could be repurposed for data. Methods for scaling a 4:3 image into these video formats vary and the exact number of pixels also vary. In one embodiment of the invention, the pillar bar region may contain 50,400 to 162,000 bytes of embedded data when each pixel is treated as a discrete element. According to one aspect of the invention, imbedded data may be concealed as visually imperceptible to users of the display device. According to one embodiment, pixels may be coded as varying black intensities which appear as solid black, wherein the black intensity levels correspond to binary data levels. While the present disclosure makes reference to the standard aspect ratios of 4:3 and 16:9, it should be appreciated that the invention is equally applicable to other aspect ratios or display formats.

Figure 3:
FIG. 3 depicts a representative example of regions in which data may be embedded within the display area of a video signal, according to one embodiment.

FIG. 3 depicts one embodiment in which a display area 300 is composed of primary image area 310 and secondary image areas 320a and 320b. The secondary image areas 320a and 320b of display area 300, which may be referred as letter bars, contain unused portions below and above the active image area with dimensions 330a and 330b. As with the embodiment of FIG. 2, data may be embedded into the unused secondary image areas 320a and 320b and may be concealed as visually imperceptible.

Figure 4:
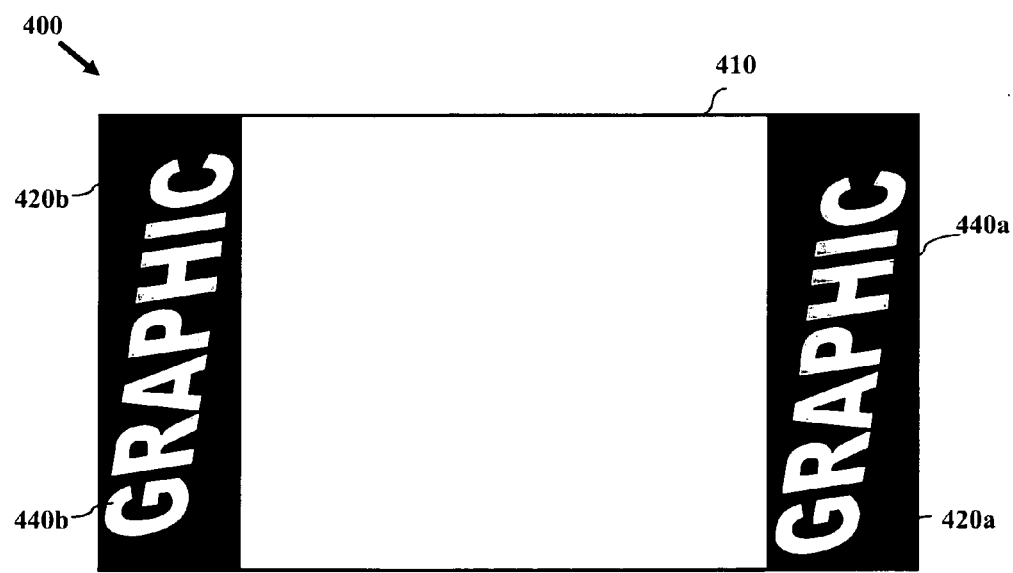
FIG. 4 depicts a representative example of regions in which data can be embedded within the display area of a video signal, according to one embodiment.

FIG. 4 depicts one embodiment of the invention wherein a display area 400 with primary image area 410 may further contain graphic images 440a-b overlaid on secondary image areas 420a-b. During commercial segments, or periods where the entire display area is not utilized, broadcasted media sources may display commercial logos or insignias in letter bars or pillar bars of the display area. In one embodiment of the invention, data may be additionally embedded into graphic images 440a-b that are displayed in the secondary image areas 420a-b of the display area 400. Through encoding techniques data would be concealed and visually imperceptible to viewers according to one embodiment of the invention.

Figure 5:
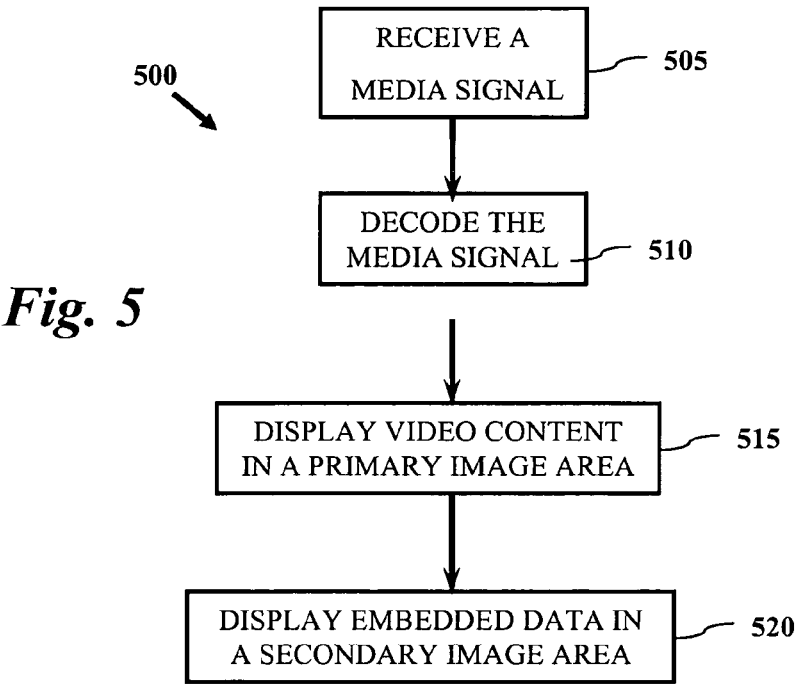
FIG. 5 depicts a method of displaying embedded data according to one embodiment.

Referring now to FIG. 5, a process 500 for displaying video content according to one embodiment of the invention is depicted. Process 500 begins with block 505 in which a media signal containing video content with embedded data is received. In one embodiment, the received media signal may be broadcasted with a first display format (e.g., a 16:9 aspect ratio). Process 500 then continues with block 510 wherein the media signal is decoded by processing logic (e.g., processing logic 160) such that video content may be presented to a user on a display device (e.g., display 135). At block 515 video content may be displayed in a primary image area of a display device where the primary image area has a second display format (e.g., 4:3 aspect ratio). Block 520 continues with displaying a secondary image area (e.g., secondary image areas 220a-b) on the display device, wherein the secondary image area is outside the primary area and contains the embedded data. The embedded data may be concealed within the secondary image area. In one embodiment, the embedded data may be concealed through translating pixel values of the video signal within the secondary image area.

Figure 6:
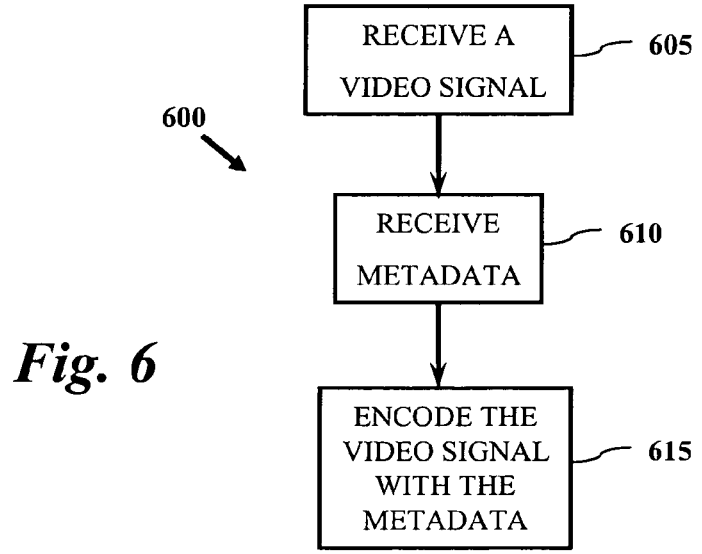
FIG. 6 depicts a method of embedding data according to one embodiment.

Referring now to FIG. 6, a process for displaying video content according to one embodiment of the invention is depicted. Process 600 begins with block 605 for receiving a video signal and proceeds to block 610 for receiving metadata which may be guide data, program related information or data for device operation. In one embodiment, the video signal may be a high definition television signal. As previously discussed, the video signal may be formatted as a NTSC, PAL, DSS, DBS or ATSC television signal. Process 600 is continued with block 615 encoding the metadata into the video signal. According to one embodiment, the metadata is encoded into the video signal but in a manner such that the metadata is visually imperceptible and concealed within the secondary image area such that the metadata is extractable from the video signal.

In one embodiment, the encoding of metadata may be executed by translating or adjusting pixel values of the video signal within the secondary image area, such that the pixel values are repurposed to contain the metadata and wherein the metadata is visually imperceptible. Translating or adjusting the pixel values may be executed by adjusting one or more lumen components of a plurality of pixels. The lumen components may adjusted by illuminating pixels at varying intensities, illuminating pixels at varying black or white intensity levels or adjusting values of the pixel such that lumen intensities may be interpreted as binary data.

According to one embodiment of the invention, translating of pixel values may be accomplished by scrolling lumen intensity values within a secondary image area or within a graphic in the secondary image area. According to another embodiment of the invention, a varying intensity graphic that scrolls through the secondary image area may also be utilized to conceal embedded data.

Translating of pixel values may be accomplished by translating color difference components of the pixel values according to another embodiment of the invention.

Figure 7:
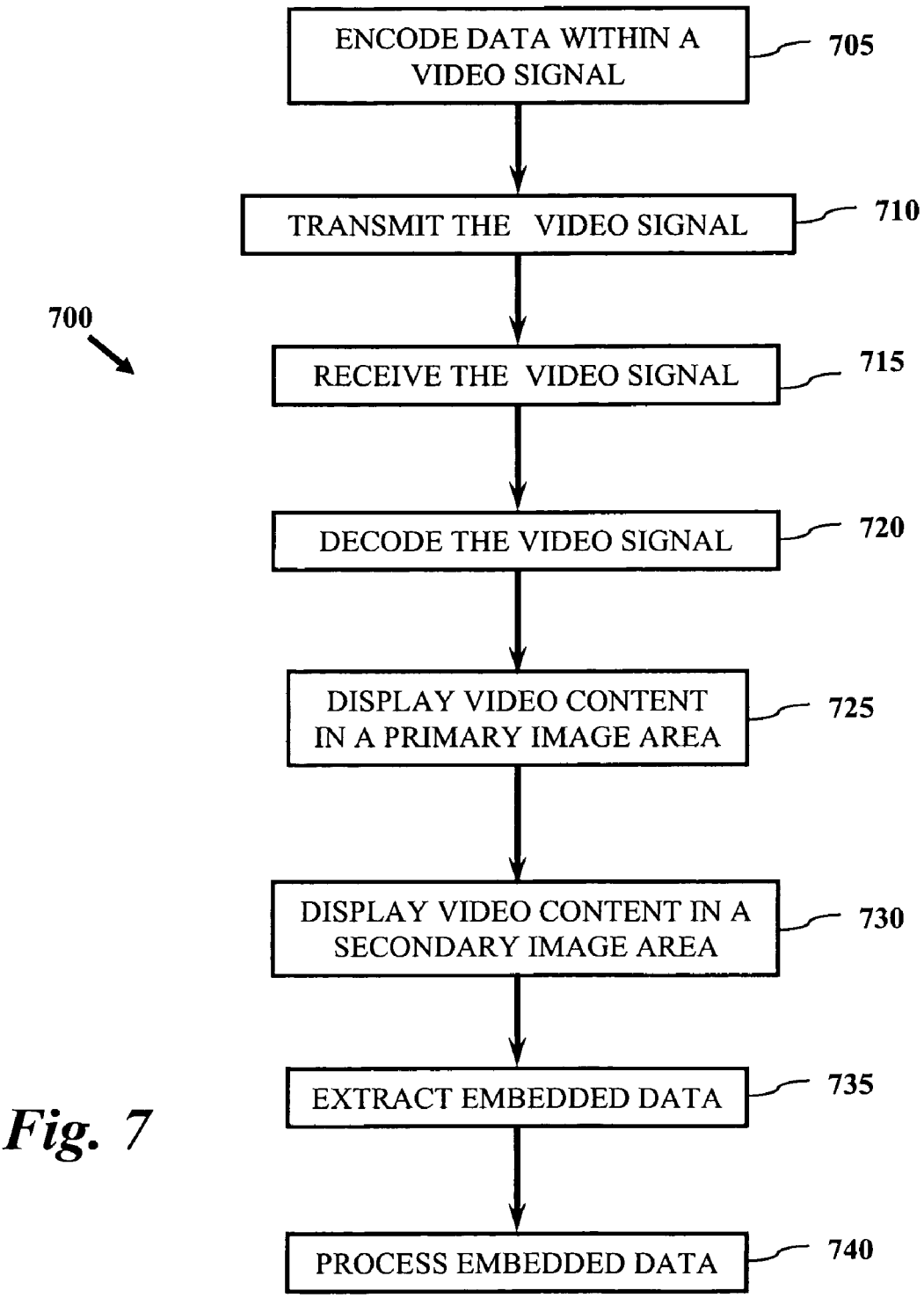
FIG. 7 depicts method steps illustrating a system for encoding and displaying data according to one embodiment.

Referring now to FIG. 7, a system for encoding and displaying video content according to one embodiment of the invention is depicted. Process 700 begins with block 705 for encoding data within a video signal. Process 700 continues with block 710 in which a media signal containing video content with embedded data is transmitted and block 715 in which a video signal is received. Process 700 then continues with block 720 wherein the media signal may be decoded by processing logic, a set top box or other client side system (e.g., processing logic 140). At block 725 video content is displayed in a primary image area of a display device. Block 730 continues with simultaneously displaying video content in a secondary image area (e.g., secondary image area 220a-b) on the display device. In block 735 the embedded data is extracted by decoding the video signal. Block 740 provides processing of the embedded data, wherein data may be stored in a memory device, utilized by the system to update device parameters or provide programming content. The embedded data may also contain network communications data for messages from the network to affiliates, displayable closed captioning data, content advisory data that may used to block objectionable programs, decodable forensic data to identify video content and/or decodable audience measurement data.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method comprising:
   receiving a media signal having a first display format from a broadcast source wherein the signal comprises video content and embedded data;
   decoding the media signal;
   displaying the video content in a primary image area of a display device, the primary image area having a second display format; and
   displaying simultaneously with the video content a secondary image area on the display device, wherein the secondary image area is outside the primary image area and contains the embedded data, and wherein the embedded data is displayed on the display device within the secondary image area such that the displayed embedded data is concealed and visually imperceptible.

2. The method of claim 1 wherein the secondary image area is a letterbox or pillarbox region of the display device.

3. The method of claim 1 wherein the embedded data is concealed within a plurality of pixels of the secondary image area.

4. The method of claim 1 wherein the embedded data is characterized by a plurality of pixel intensity differences.

5. The method of claim 1 wherein the embedded data is concealed within a varying intensity graphic that scrolls through the secondary image area.

6. The method of claim 1 wherein the embedded data comprises at least one of: guide data, program related information, network messages, audience measurement data, forensic markers, closed captioning, and content advisory data.

7. An apparatus for displaying media content comprising:
   a network interface which receives a media signal from a broadcast source, wherein the media signal comprises video content and embedded data;
   a processor coupled to the network interface, the processor configured to:
   decode the media signal;
   display the video content in a primary image area of a display device; and
   display simultaneously with the video content, a secondary image area on the display device wherein the secondary image area is outside the primary image area and contains the embedded data which is displayed on the display device such that the displayed embedded data is concealed and visually imperceptible.

8. The apparatus as described in claim 7 wherein said processor is further configured to display concealed data within a plurality of pixels of the secondary image area.

9. The apparatus as described in claim 7 wherein said processor is further configured to display embedded data as a plurality of pixel intensity differences.

10. The apparatus as described in claim 7 wherein said processor is further configured to display embedded data as scrolling intensity values within the secondary image area.

11. The apparatus as described in claim 7 wherein said processor is further configured to display embedded data as a varying intensity graphic that scrolls through the secondary image area.

12. A method for encoding metadata into a video signal having primary and secondary image areas comprising:
   receiving metadata; and
   encoding the metadata into the video signal by translating pixel values of the video signal within the secondary image area, wherein the secondary image area is outside the primary image area and contains the embedded data, such that those pixel values are repurposed to contain the metadata and wherein the metadata is concealed and visually imperceptible when decoded and displayed.

13. The method of claim 12 wherein the secondary image area is a letterbox or pillarbox region of the video signal.

14. The method of claim 12 wherein translating the pixel values of the video signal within the secondary image area further comprises translating one or more lumen components of a plurality of pixels.

15. The method of claim 14 wherein translating the one or more lumen components of the plurality of pixels comprises illuminating pixels at varying intensities.

16. The method of claim 12 wherein translating the one or more lumen components of a plurality of pixels comprises adjusting values of the pixels such that lumen intensities may be interpreted as binary data.

17. The method of claim 12 wherein translating the pixel values of the video signal within the secondary image area further comprises scrolling intensity values within the secondary image area.

18. The method of claim 17 wherein scrolling intensity values within the secondary image area further comprises a varying intensity graphic that scrolls through the secondary image area.

19. The method of claim 12 wherein encoding the metadata into the video signal is performed such that the metadata is extractable from video signal.

20. The method of claim 12 wherein the embedded metadata comprises at least one of: guide data, program related information, network messages, audience measurement data, forensic markers, closed captioning, and content advisory data.

21. An apparatus for encoding metadata into a video signal comprising:
    a video content input;
    a metadata input;
    an encoder coupled to said video content input and metadata input, said encoder to execute one or more actions to translate pixel values of the video signal within a secondary image area, wherein the secondary image area is outside the primary image area and contains the embedded data, such that those pixel values are repurposed to contain the metadata and wherein the metadata is concealed and visually imperceptible when decoded and displayed.

* * * * *